(No Model.)
T. W. OWENS.
FRUIT DRIER.
No. 361,075. Patented Apr. 12, 1887.
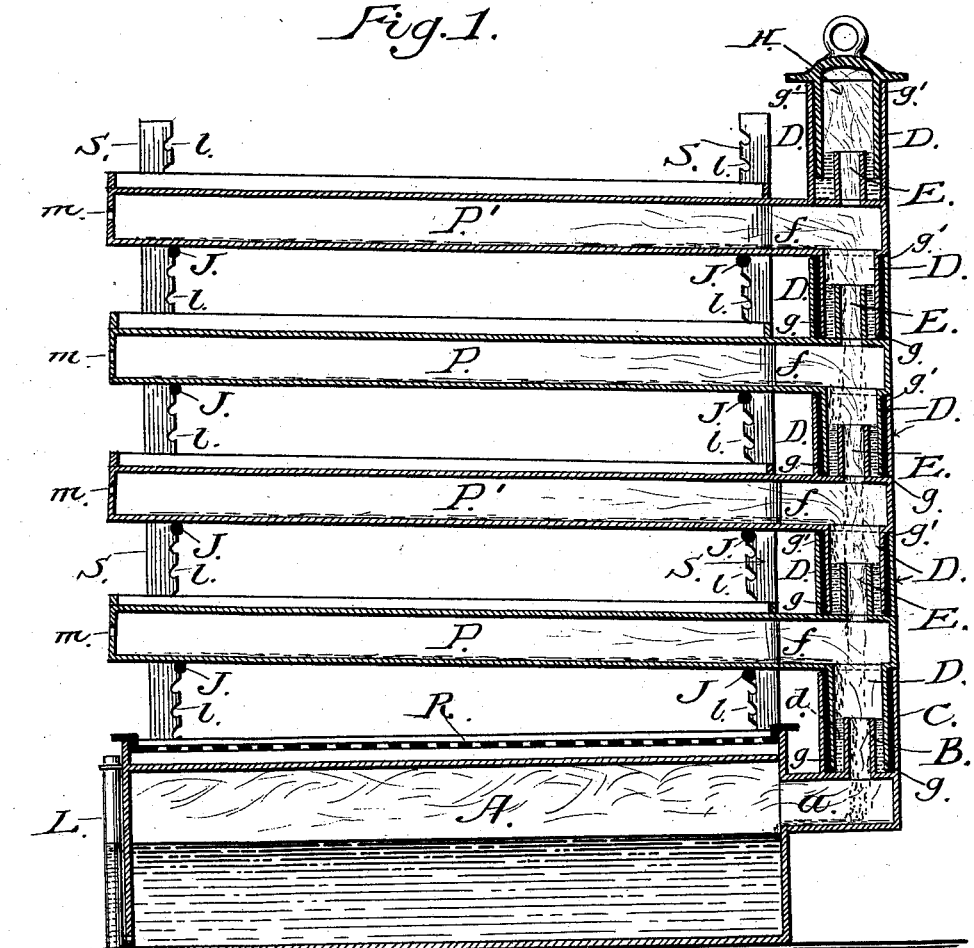
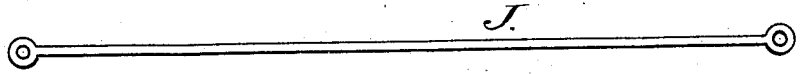
Witnesses
Walter Fowler
H. B. Applewhait
Inventor
Thomas W. Owens
By his Attorney
A. H. Evans

UNITED STATES PATENT OFFICE.

THOMAS W. OWENS, OF GRANVILLE, OHIO.

FRUIT-DRIER.

SPECIFICATION forming part of Letters Patent No. 361,075, dated April 12, 1887.

Application filed July 10, 1886. Serial No. 207,687. (No model.)

*To all whom it may concern:*

Be it known that I, THOMAS W. OWENS, a citizen of the United States, residing at Granville, in the county of Licking and State of Ohio, have invented certain new and useful Improvements in Fruit-Driers, of which the following is a full, clear, and exact description, reference being had to the accompanying drawings, forming part of this specification, in which—

Figure 1 represents a longitudinal sectional view of a fruit-drier embodying my invention. Fig. 2 is a detail to be referred to.

This invention relates to apparatus for drying small fruit; and it consists in the peculiar construction and combination of elements, all of which I will hereinafter fully describe and claim.

To enable others skilled in the art to which my invention appertains to make and use the same, I will now describe its construction and indicate the manner in which the same is carried out.

In the said drawings, A represents a boiler, of any suitable construction and dimension, in which steam is generated to supply the necessary heat to the pans containing the fruit. The boiler A is provided with a passage or tube, *a*, which communicates with the interior of said boiler, and serves as an outlet for the steam. The boiler is also provided with two short vertical tubes, B and C, the former having a diameter and height less than that of the latter, whereby a space, *d*, is left between said tubes, for a purpose I will hereinafter make manifest.

Vertical standards S are secured to the boiler at points near the corners of the same, and assist in supporting the pans upon which the fruit is placed to be dried. These pans P are of peculiar formation, and are hollow to permit the passage of the steam for effecting the thorough drying of the fruit. They are each provided with a horizontal tube or passage, *f*, and vertical pipes or tubes D, D', and E, which are in communication with the passage *f*. The tubes D D' are larger than the tubes E, and extend above and below the pan, as shown, the lower end, *g*, of said tubes being adapted to enter the space *d*, formed by the tubes B and C and D and E, while the upper end, *g'*, receives the lower end of a tube, D', projecting from a pan, P', located immediately over the pan P.

Any number of pans may be employed in carrying out my invention, and each pan will be provided with tubes corresponding with the tubes D, D', and E, whereby the lower end of said tube D' enters the space between the tubes on the pan immediately below it, while its upper end receives the lower portion of the tube immediately above it. The arrangement of these pans in the manner above stated permits the ready removal or separation of the same, while jointly they form a chamber in which the steam ascends, and from whence it passes through the tubes or passages *f* into the series of pans. The chamber thus formed is closed at the top by a suitable cap, H, which should be of a size adapting it to the ends of any of the larger tubes, such as D, so that when it is desired to remove any one or more of said pans the cap may be removed from its position on the tube projecting from the top pan and be placed over and close the opening in the top of the tube projecting from the pan immediately below the lowest pan removed. The pans P are inclined toward the tubes, and are loosely supported upon rods J, or equivalent devices, which are removably secured in notches or openings *l*, formed in the standards S, whereby the inclination of said pans may be varied by simply changing the rods from one notch or opening to another. The steam after it enters the pans condenses, and the water of condensation is caused to travel toward the tube or inlet end of said pan, from whence it is discharged in the spaces *d* between the tubes, the surplus steam passing out through small openings *m* in the opposite end of the pan.

In the practical operation of my apparatus the cap is removed and the necessary amount of water poured into the steam-chamber. In its descent the water falls within and fills the spaces *d*, thus forming a seal at the points where the tubes of contiguous pans meet, and effectually prevents the escape of steam at said points. The steam as it is generated fills the chamber and pans, while the water of condensation not only keeps the spaces filled with water, but flows over the tops of the smaller or inner tubes, B and E, into the boiler. In connection with the boiler I employ a glass tube, L, by means of which the depth of water within the boiler may be readily determined.

If desired, a perforated pan, R, may be placed immediately over the top plate of the boiler or pans to receive green fruit, which is effectually dried by the hot air arising from said boiler or pans.

Having thus described my invention, what I claim as new, and desire to secure by Letters Patent, is—

An improved fruit-drier consisting of the boiler A and pans P P', said boiler and pans having a plural number of tubes of different diameters, the said tubes being at one end of said pans only and forming jointly a steam-chamber, a cover, H, for closing the top of the larger tubes of said pans, the notched standards S, and the rods J, for supporting said pans, all constructed and arranged to operate as herein described.

THOMAS W. OWENS.

Witnesses:
T. WALTER FOWLER,
ANDREW PARKER.